(12) United States Patent
Nakai et al.

(10) Patent No.: US 9,466,162 B2
(45) Date of Patent: Oct. 11, 2016

(54) ELECTRONIC KEY SYSTEM, AND LOCK-SIDE TERMINAL AND PORTABLE TERMINAL EMPLOYED IN SAME

(75) Inventors: Yoshihiro Nakai, Kobe (JP); Yasuaki Takimoto, Tokyo (JP); Masahiro Abukawa, Tokyo (JP); Takeshi Mitsui, Tokyo (JP); Hisao Nakano, Tokyo (JP)

(73) Assignee: MITSUBISHI ELECTRIC COPORATION, Tokyo (JP)

( * ) Notice: Subject to any disclaimer, the term of this patent is extended or adjusted under 35 U.S.C. 154(b) by 323 days.

(21) Appl. No.: 14/342,410

(22) PCT Filed: Nov. 22, 2011

(86) PCT No.: PCT/JP2011/006496
§ 371 (c)(1),
(2), (4) Date: Mar. 3, 2014

(87) PCT Pub. No.: WO2013/076760
PCT Pub. Date: May 30, 2013

(65) Prior Publication Data
US 2014/0232524 A1    Aug. 21, 2014

(51) Int. Cl.
*G07C 9/00* (2006.01)
*B60R 25/24* (2013.01)

(52) U.S. Cl.
CPC ............ *G07C 9/00309* (2013.01); *B60R 25/24* (2013.01); *G07C 2009/00793* (2013.01); *G07C 2009/00865* (2013.01)

(58) Field of Classification Search
CPC ....... B60R 25/24; B60R 25/241; G07C 9/00; G07C 9/00309; G07C 2009/00388; G07C 2009/00412; G07C 2009/00769; G07C 2009/00793; G07C 9/00817; G07C 9/00857; G07C 2009/00865; G07C 2209/04; H04B 5/00; H04B 7/00; H04B 7/15; H04L 7/00; H04L 9/08; H04L 9/32; H04L 63/061; H04M 1/7253; H04W 4/008; H04W 12/00; H04W 12/04; H04W 12/08; H04W 76/023; G06F 21/00
USPC ............ 340/426.11, 426.13, 426.14, 426.35, 340/426.36, 5.1, 5.2, 5.61, 5.72
See application file for complete search history.

(56) References Cited

U.S. PATENT DOCUMENTS

| 2006/0255910 | A1 | 11/2006 | Fukushima et al. | |
| 2010/0210319 | A1* | 8/2010 | Tanaka ..................... | B60R 25/24 455/572 |
| 2012/0075057 | A1* | 3/2012 | Fyke ................... | G07C 9/00103 340/5.3 |
| 2013/0099892 | A1* | 4/2013 | Tucker ............... | G07C 9/00309 340/5.61 |

FOREIGN PATENT DOCUMENTS

| DE | 19821998 C1 | 10/1999 |
| DE | 10100576 A1 | 3/2002 |

(Continued)

*Primary Examiner* — Brian Wilson
(74) *Attorney, Agent, or Firm* — Birch, Stewart, Kolasch, & Birch, LLP.

(57) ABSTRACT

An electronic key system includes a lock-side terminal that is mounted in a locked object and capable of at least locking and unlocking the locked object, and a portable terminal capable of sending and receiving the electronic key to and from the lock-side terminal mounted in the locked object and the other portable terminals, and when receiving a request from the one portable terminal, the lock-side terminal generates the electronic key at random, and sends the randomly generated electronic key to the one portable terminal.

9 Claims, 16 Drawing Sheets

(56) References Cited

FOREIGN PATENT DOCUMENTS

| | | |
|---|---|---|
| DE | 102004006734 A1 | 9/2005 |
| GB | 2340644 A | 2/2000 |
| JP | 2002-175588 A | 6/2002 |
| JP | 2004-213358 A | 7/2004 |
| JP | 2004-238941 A | 8/2004 |
| JP | 2007-113306 A | 5/2007 |
| WO | WO 2005/070733 A1 | 8/2005 |
| WO | WO 2009/035099 A1 | 3/2009 |

* cited by examiner

| Transfer Source Signature | Transfer Destination Information | Vehicle Signature | Encrypted With Vehicle Public Key |
|---|---|---|---|
| | | | Reservation Person Dedicated Electronic Key |

FIG.16

| Copy Destination Signature | Copy Source Information | Function Limitation Information | Vehicle Signature | Encrypted With Vehicle Public Key<br>Reservation Person Dedicated Electronic Key |

FIG.17

| Copy Destination Signature | Copy Source Information | Function Limitation Information | Transfer Source Signature | Transfer Destination Information | Vehicle Signature | Encrypted With Vehicle Public Key<br>Reservation Person Dedicated Electronic Key |

ELECTRONIC KEY SYSTEM, AND LOCK-SIDE TERMINAL AND PORTABLE TERMINAL EMPLOYED IN SAME

TECHNICAL FIELD

The present invention relates to an electronic key system that can perform of unlocking of a door and so on without inserting a key thereinto.

BACKGROUND ART

In recent years, a vehicle such as an automobile is increasingly equipped with an electronic key as standard. Without even the need of pressing a button for locking or unlocking like a remote controller, this electronic key enables a user to unlock a door lock by just approaching the vehicle or touching a door knob, or start an engine by just pressing a start button without inserting a key thereinto upon getting into the vehicle.

In Patent Document 1, for example, the electronic key are used in a rent-a-car system. In this technique, when a rental contract is established, an electronic key is sent from a center to a portable terminal, and becomes valid at a reserved time, which allows a rental car to be locked, unlocked, or the engine to be started.

In addition, in Patent Document 2, for example, there is disclosed a technique in which functions available to a user using a car sharing service are transmitted to a mobile device in a limited state at the time of reservation. This technique discloses the one that selects what in which function (for example, in, charging based on an available option such as navigation and ETC) is used among the functions provided in the rental car, which provides a function limitation only at the time of reservation.

PRIOR ART DOCUMENTS

Patent Documents

Patent Document 1: Japanese Patent Application Laid-open No. 2002-175588
Patent Document 2: Japanese Patent Application Laid-open No. 2004-238941

SUMMARY OF THE INVENTION

Problems to be Solved by the Invention

However, in the conventional electronic key system, since only the portable terminal acquiring the electronic key can operate the rental car, there is a problem such that, for example, in a case where a reservation person that is a holder of the portable terminal cannot return the key (car) because of an urgent matter or the like, the car cannot be operated if the portable terminal of the reservation person is not passed to someone the operation is wished instead.

The present invention is made to solve the foregoing problem, and an object of the invention is to provide an electronic key system in which only a function of an electronic key can be passed (transferred or copied) without the need of passing a physical key, a card, a portable terminal, and/or the like, and a lock-side terminal and a portable terminal used in this system.

Means for Solving the Problem

In order to achieve the above object, this invention provides an electronic key system including: a first information processing unit having an electronic key generation storage that generates stores at random an electronic key including function information defining an operable function to the locked object, and capable of at least locking and unlocking the locked object by receiving a request from one portable terminal, and a first wireless transceiver unit capable of sending and receiving various pieces of information including the electronic key to and from one portable terminal; a portable terminal including a second wireless transceiver unit capable of sending and receiving information to and from the lock-side terminal and the other portable terminals, and a second information processing unit including an electronic key storage that stores the electronic key received from the lock-side terminal via the second wireless transceiver unit, characterized in that; another portable terminal including a third wireless transceiver unit capable of sending and receiving information to and from the one lock-side terminal, and a third information processing unit having an electronic key storage, wherein the first information processing unit instructs the first wireless transceiver unit to send the electronic key previously stored to the one portable terminal when receiving the request from the one portable terminal via the first wireless transceiver unit, wherein when receiving a request to transfer or copy the electronic key stored in the electronic key storage to the other portable terminal, the second information processing unit instructs the second wireless transceiver unit to send the request to transfer or copy the electronic key with function limitation information in which only a selected function is enabled to the other portable terminal, and in a case where there is a response of transfer or copy possible with respect to the request to transfer or copy the key from the other terminal via the second wireless transceiver unit, the second information processing unit instructs the second wireless transceiver unit to transfer or copy the electronic key to the other portable terminal, wherein when receiving the request to transfer or copy the electronic key from the one portable terminal via the third wireless transceiver unit, the third information processing unit determines whether or not the transfer or copy is possible, and sends to the one portable terminal the response of transfer or copy possible, or transfer or copy impossible based on a result of the determination, and when the electronic key is transferred or copied from the one portable terminal via the third wireless transceiver unit, the transferred or copied electronic key is stored in the electronic key storage of the third information processing unit.

Effect of the Invention

According to the present invention, since only a function of the electronic key can be passed (transferred or copied) to another person without the need of passing a physical key, a card, a portable terminal, and/or the like thereto, for example, an operation of the locked object can be asked someone in a remote location instead, resulting in a great convenience.

BRIEF DESCRIPTION OF THE DRAWINGS

FIG. 16 is a diagram showing a format of the electronic key stored in an electronic key storage unit of the copy destination portable terminal.

FIG. 17 is a diagram showing a format of the electronic key in a case where a transferred electronic key is further copied.

BEST MODE FOR CARRYING OUT THE INVENTION

In the following, embodiments of the present invention will be described in detail with reference to the accompanying drawings. Embodiment 1.

In an electronic key system for car sharing, there is described a case using a portable terminal as a key. This electronic key system includes a lock-side terminal (vehicle-side terminal) mounted in a vehicle that is a locked object, and a portable terminal held and used by a user, and when the portable terminal is located within a predetermined range from the locked object (vehicle), operations such as locking and unlocking of the locked object (vehicle), and starting the engine can be carried out by an electronic key included in the portable terminal.

Figure 1:
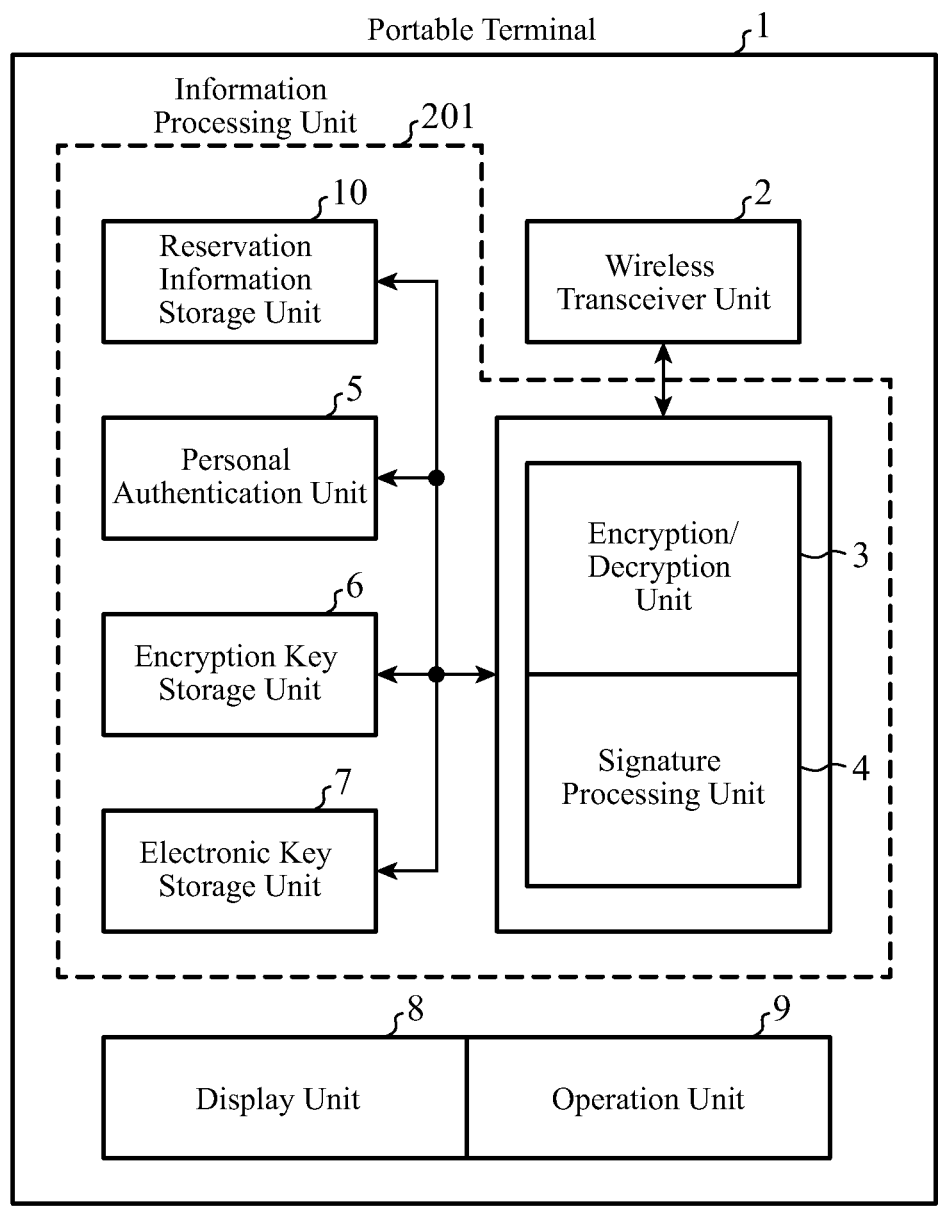
FIG. 1 is a block diagram illustrating a configuration of a portable terminal used in an electronic key system in Embodiment 1.

FIG. 1 is a block diagram illustrating a configuration of a portable terminal used in the electronic key system in Embodiment 1 of this invention. The portable terminal 1 includes a wireless transceiver unit 2 for transmitting and receiving the electronic key and various pieces of information, an encryption/decryption unit 3 for encrypting and decrypting the electronic key, a signature processing unit 4 that performs digital signature processing to the electronic key, a personal authentication unit 5 that performs personal authentication when an operation with the electronic key, for example, is carried out, an encryption key storage unit 6 for handling a public key for an encryption in transferring or copying thereof, and/or a private key for a digital signature, an electronic key storage unit 7 for storing a decrypted electronic key, a display unit 8 for displaying information in the operation and so on to a user, an operation unit 9 operable by the user, and a reservation information storage unit 10 for storing information when a reservation is made. In addition, an information processing unit 201 is configured with the encryption/decryption unit 3, signature processing unit 4, personal authentication unit 5, encryption key storage unit 6, electronic key storage unit 7, and reservation information storage unit 10 mentioned above.

Figure 2:
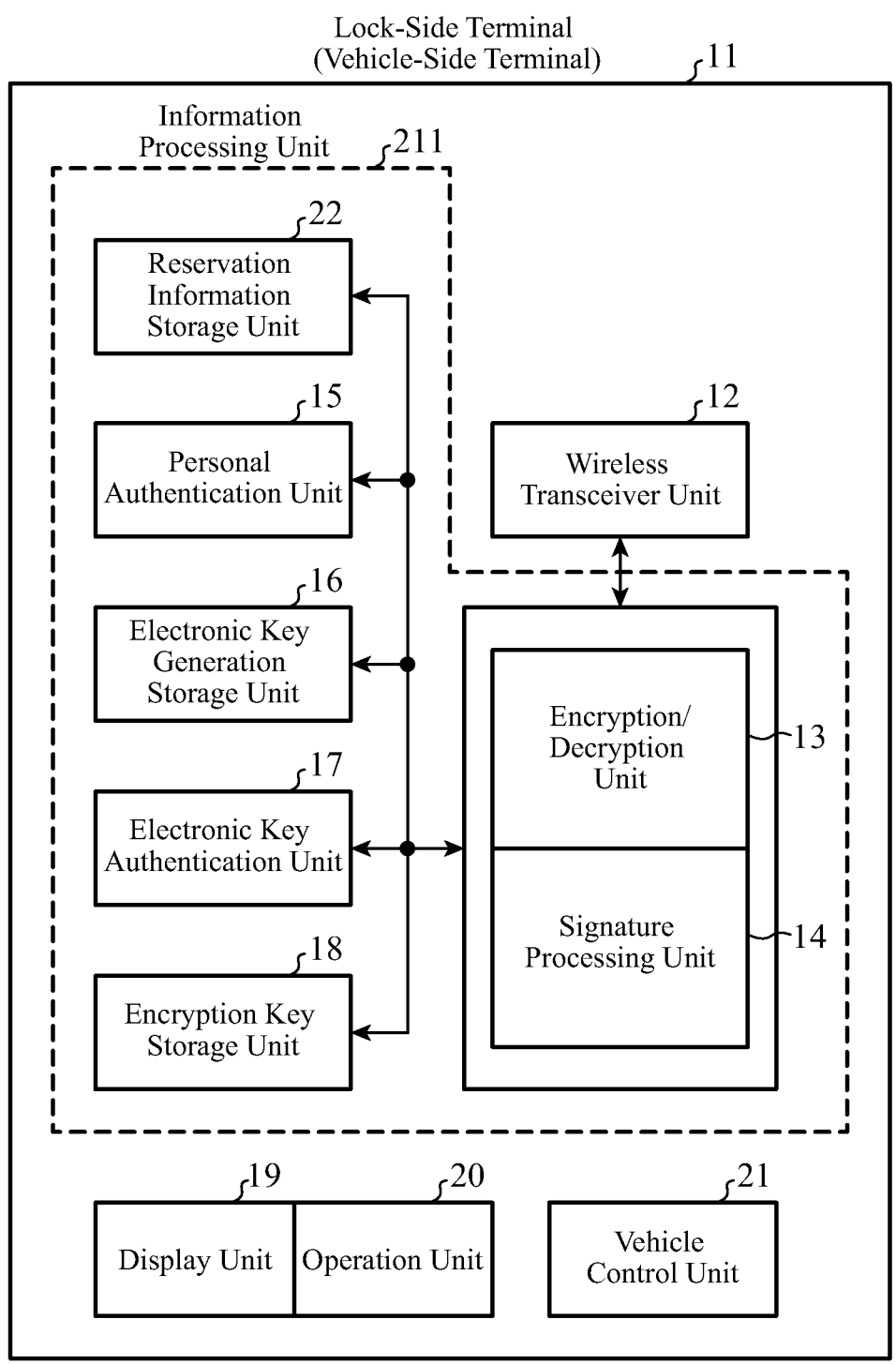
FIG. 2 is a block diagram illustrating a configuration of a lock-side terminal used in the electronic key system in Embodiment 1.

Further, FIG. 2 is a block diagram illustrating a configuration of a lock-side terminal used in the electronic key system in Embodiment 1 of this invention. The lock-side terminal (vehicle-side terminal) 11 includes a wireless transceiver unit 12 for transmitting and receiving the electronic key and various pieces of information, an encryption/decryption unit 13 for encrypting and decrypting the electronic key, a signature processing unit 14 that performs the digital signature processing to the electronic key, a personal authentication unit 15 that performs the personal authentication when the operation with the electronic key, for example, is carried out, an electronic key generation storage unit 16 that generates the electronic key of the vehicle at random, an electronic key authentication unit 17 for authenticating the electronic key received from the portable terminal 1, an encryption key storage unit 18 for handling the public key for the encryption in transferring or copying thereof, and/or the private key for the digital signature, a display unit 19 for displaying the information in the operation and so on to the user, an operation unit 20 operable by the user, a vehicle control unit 21 for performing a vehicle control which is enabled by the authentication of the electronic key, and a reservation information storage unit 22 for storing information on a reservation person. In addition, an information processing unit 211 is configured with the encryption/decryption unit 13, signature processing unit 14, personal authentication unit 15, electronic key generation storage unit 16, electronic key authentication unit 17, encryption key storage unit 18, and reservation information storage unit 22 mentioned above.

Figure 3:
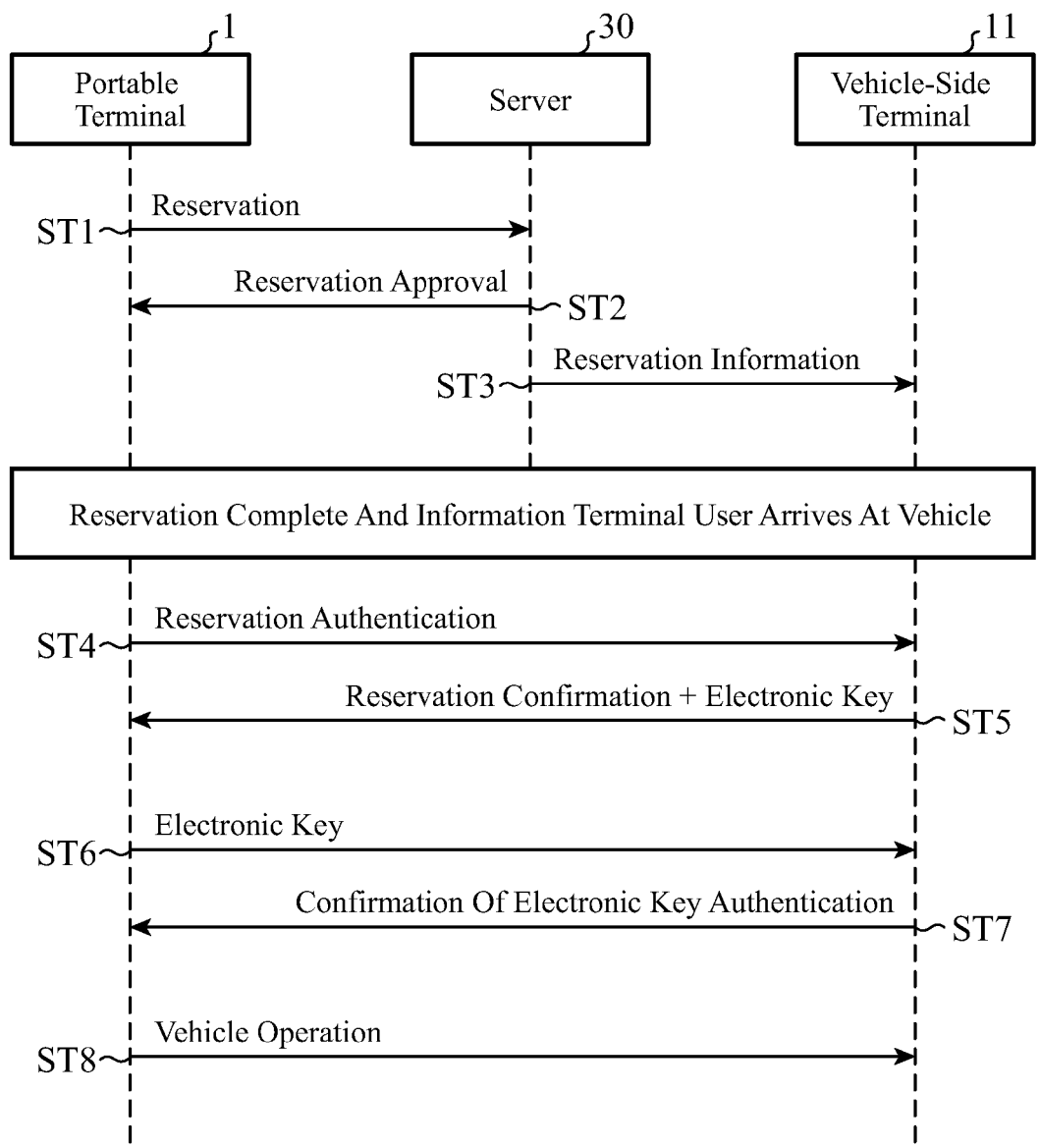
FIG. 3 is a diagram showing a processing sequence at the time of reservation.

FIG. 3 is a diagram showing a process sequence at the time of reservation. In Embodiment 1, it is configured that while a server manages the vehicle, the user make a reservation to the server.

First of all, a user who holds a portable terminal 1 accesses the server 30 and makes a reservation (request for using the vehicle) (step ST1). When accepting the reservation from the portable terminal 1, the server 30 processes the content of the reservation, and if the reservation is established, it sends a reservation approval to the user together with information of reservation results (for example, a vehicle number, a location thereof, public key information of the vehicle, and so on) (step ST2). Also, at the same time, the server sends reservation information (such as a user's portable terminal number (MAC address and so on), reservation date, user's public key information, and so on) to the vehicle-side terminal 11 mounted in a reserved vehicle (step ST3). In an example of this sequence, the electronic key is not given to the user yet at this point and will be made available in the later processing. This configuration makes it unnecessary to transmit the electronic key through the public line and therefore is safe.

The, once the reservation is complete, the user who holds the portable terminal 1 approaches the reserved vehicle and authenticates the reservation with the vehicle-side terminal 11 mounted in the vehicle (step ST4). If the reservation content can be confirmed, the vehicle-side terminal 11 sends the electronic key along with the reservation confirmation results to the portable terminal 1 (step ST5). With this configuration, the user obtains the electronic key from the vehicle. The electronic key will be described later in detail.

Thereafter, the user sends the obtained electronic key to the vehicle (step ST6), and when the electronic key authentication is confirmed in the vehicle-side terminal 11 (step ST7), the vehicle is made operable (step ST8). Note that the processing from step ST6 to step ST8 are a common sequence in operating the vehicle with the use of the obtained electronic key, and these will be described later.

Here, when the portable terminal 1 held by the user obtains the electronic key from the vehicle-side terminal 11 in steps ST3 to ST5, the processing in the portable terminal 1 and the processing in the vehicle-side terminal 11 will be described in detail.

Figure 4:
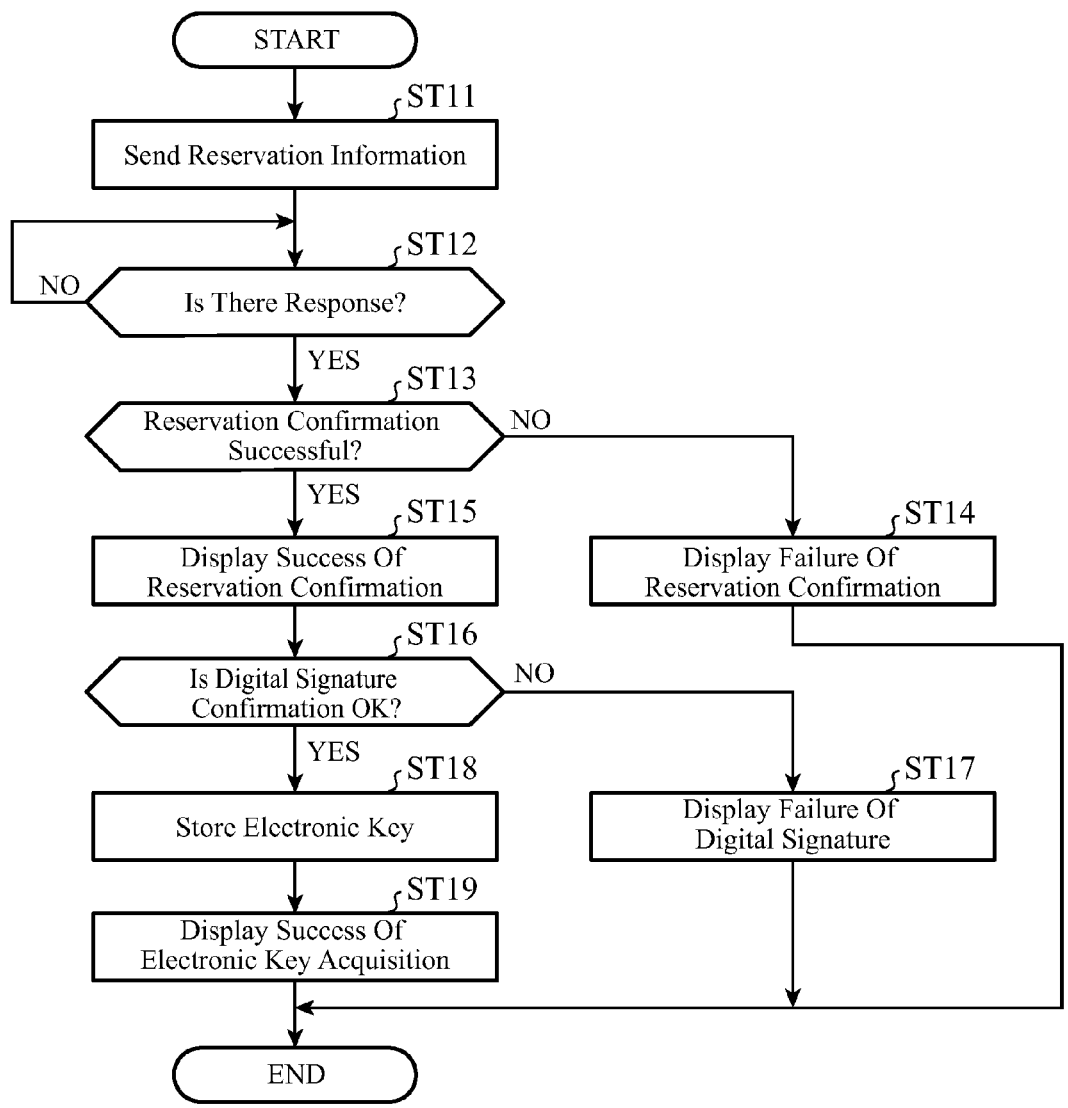
FIG. 4 is a flowchart showing processing in the portable terminal about an acquisition of an electronic key.

FIG. 4 is a flowchart showing processing of acquiring an electronic key in the portable terminal 1 about the acquisition of the electronic key. Note that it is assumed that the public key of the vehicle has been obtained previously from the reservation information and so on at the time of reservation.

First of all, the reservation information received from the server 30 and stored in the reservation information storage unit 10 is sent from the wireless transceiver unit 2 of the portable terminal 1 to the vehicle (vehicle-side terminal 11) (step ST11), and a response from the vehicle-side terminal 11 is waited for (step ST12). If there is the response from the vehicle-side terminal 11, it is received by the wireless transceiver unit 2, and the results of the reservation confirmation are confirmed (step ST13).

If the reservation confirmation is failed (if NO at step ST13), an effect of failure of the reservation confirmation is displayed on the display unit 8 (step ST14), and the processing is ended. On the other hand, if the reservation confirmation is successful (if YES at step ST13), an effect of success of the reservation confirmation is displayed on the display unit 8 (step ST15), and the digital signature of the received information is confirmed (verified) with the use of the public key of the vehicle in the signature processing unit 4 (step ST16). At this stage, if the signature cannot be confirmed as that of the reserved vehicle (if NO at step ST16), an effect of failure of the digital signature is displayed on the display unit 8 (step ST17), and the processing is ended. On the other hand, if the digital signature can be confirmed as that from the reserved vehicle (if YES at step ST16), the electronic key is stored in the electronic key storage unit 7 (step ST18), and an effect of acquisition of the electronic key (effect of acquisition success of the electronic key) is displayed (step ST19), and the processing is ended.

Incidentally, the encrypting and decrypting processing with the use of the private and public keys is a technology of a common public key system, and thus explanations thereof will be omitted herein.

Figure 5:
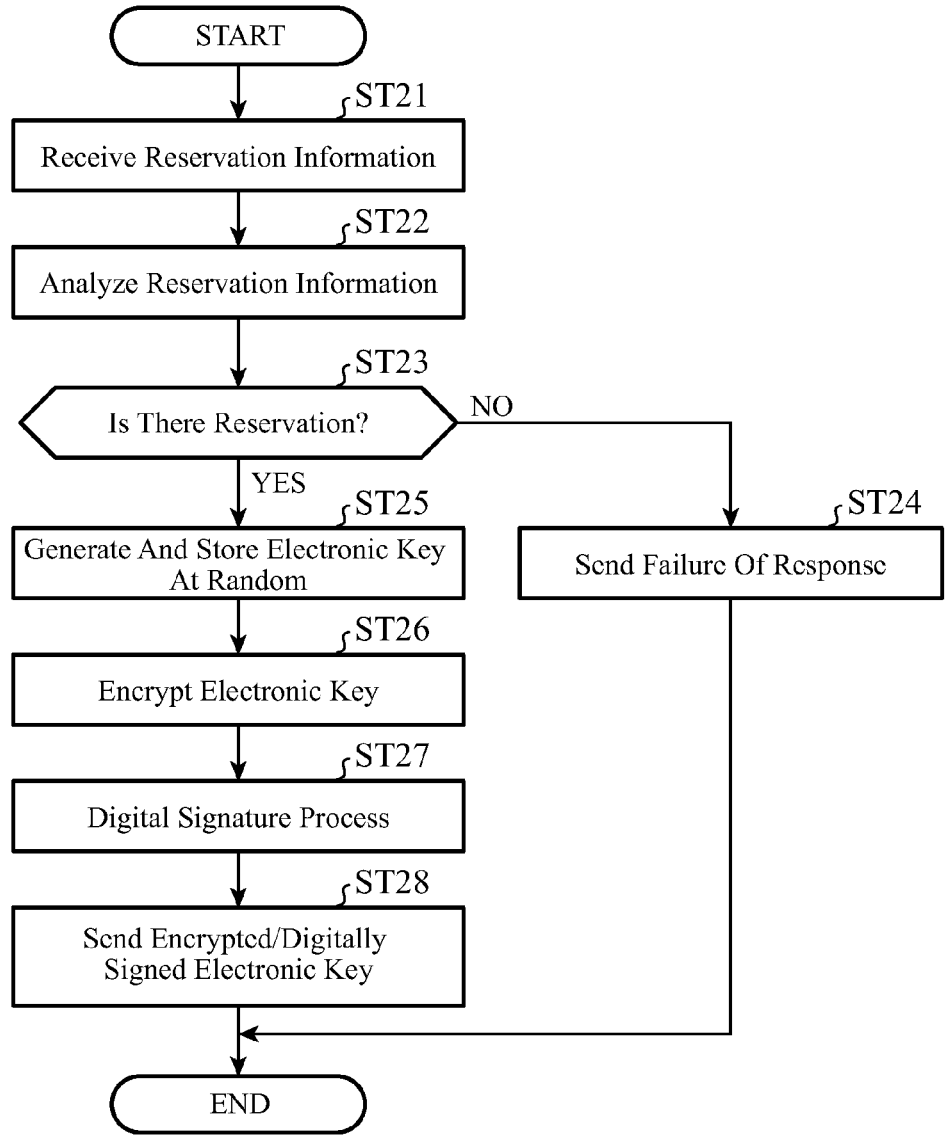
FIG. 5 is a flowchart showing processing in a vehicle-side terminal about the acquisition of the electronic key.

FIG. 5 is a flowchart showing processing in the vehicle-side terminal 11 about the acquisition of the electronic key.

First of all, the wireless transceiver unit 12 of the vehicle-side terminal 11 receives the reservation information (request of the electronic key) from the user's portable terminal 1 (step ST21). The received reservation information is analyzed (step ST22), and whether or not there is the matched reservation information is confirmed among the information stored in the reservation information storage unit 22 (step ST23).

If there is no matched reservation information (if NO at step ST23), a failure of response is sent from the wireless transceiver unit 12 to the portable terminal 1 (step ST24), and the processing is ended. On the other hand, if there is the matched reservation information (if YES at step ST23), the electronic key generation storage unit 16 generates the electronic key at random and stores the resultant (step ST25). When the information (such as signature information) of the reservation person is embedded into this electronic key, it is contemplated such that whose electronic key it is can be made clear. By doing this, it is also contemplated such that the electronic key will not function without the digital signature of the reservation person. In addition, this electronic key includes function information that defines a function operable with the vehicle (opening/closing the door (locking/unlocking), starting the engine, a navigation operation, a trunk operation, and so on).

Then, the information processing unit 211 encrypts the generated electronic key with the public key of the vehicle in the encryption/decryption unit 13 (step ST26), adds the digital signature of the vehicle thereto by the signature processing unit 14 (step ST27), and instructs the wireless transceiver unit 12 to send an effect of success of the reservation confirmation along with the obtained encrypted/digitally signed electronic key to the portable terminal 1. Then, the encrypted/digitally signed electronic key and the effect of success of the reservation confirmation are sent from the wireless transceiver unit 12 to the portable terminal 1 (step ST28), and the processing is ended.

Figure 6:
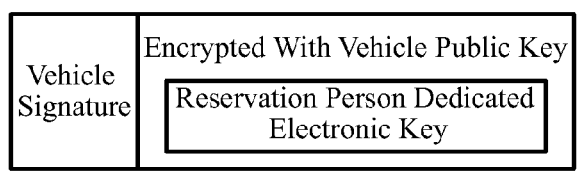
FIG. 6 is a diagram showing a format of the electronic key.

FIG. 6 is a diagram showing a format of the electronic key in which the vehicle-side terminal 11 generates the key at random to be sent to the portable terminal 1, and stored in the electronic key storage unit 7 of the portable terminal 1 receiving it in the flowcharts shown in FIG. 4 and FIG. 5.

As mentioned above, when the electronic key is generated at random in the vehicle-side terminal 11, and the electronic key to which the signature information of the vehicle is added and which is encrypted with the public key of the vehicle is sent to the portable terminal 1, security of the electronic key delivered between the vehicle-side terminal 11 and portable terminal 1 can be enhanced.

Moreover, regarding the processing the acquisition of the electronic key at the time of reservation, in FIG. 3, only the information of the reservation results is acquired from the server 30, but the electronic key of the vehicle may also be acquired via the server 30 at the time of reservation.

Figure 7:
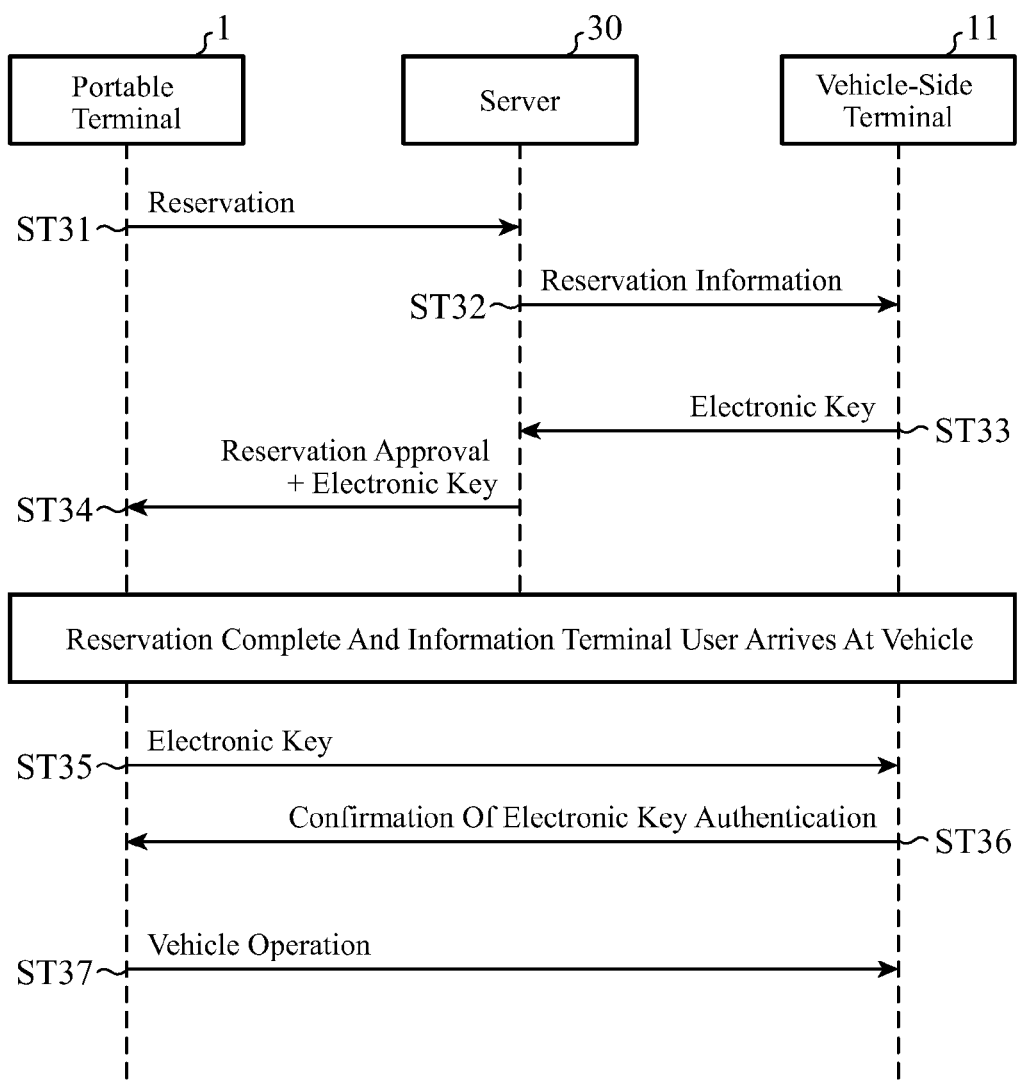
FIG. 7 is a diagram showing a processing sequence where the portable terminal acquires also the electronic key of the vehicle at the time of reservation.

FIG. 7 is a diagram showing a processing sequence in a case where the portable terminal 1 acquires also the electronic key of the vehicle at the time of reservation.

First of all, the user who holds the portable terminal 1 accesses the server 30 and makes a reservation (request to use the vehicle) (step ST31). When receiving the reservation from the portable terminal 1, the server 30 sends the reservation information (reservation date, user's public key information, and so on) to the vehicle-side terminal 11 (step ST32). Then, the vehicle-side terminal 11 generates an electronic key based on the received reservation information, encrypts the key with the user's public key information, adds the digital signature thereto, and sends the resultant to the server 30 (step ST33). The server 30 sends the encrypted electronic key received from the vehicle-side terminal 11 and an effect of approval of reservation to the portable terminal 1 (step ST34), and the reservation is completed.

The following processing of step ST35 to step ST37 is a common sequence of operating the vehicle with the use of the electronic key, which is the same as that of steps ST6 to ST8 as shown in FIG. 3, and this will be described later.

Figure 8:
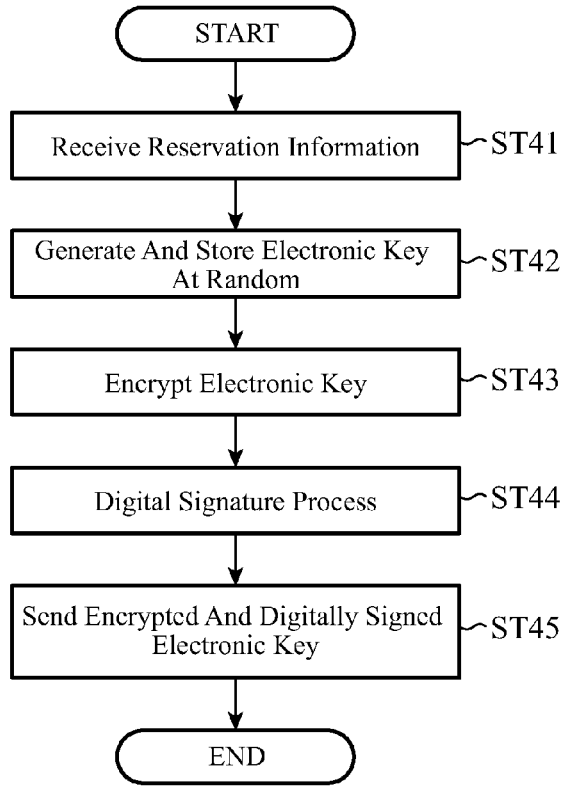
FIG. 8 is a flowchart showing processing in the vehicle-side terminal when the portable terminal acquires the electronic key from the vehicle-side terminal.

Here, the processing in the vehicle-side terminal 11 when the portable terminal 1 held by the user acquires the electronic key from the vehicle-side terminal 11 in steps ST32 to ST34 will be described in detail with reference to the flowchart of FIG. 8.

First of all, the wireless transceiver unit 12 of the vehicle-side terminal 11 receives the reservation information from the server 30 (step ST41). The electronic key generation storage unit 16 generates the electronic key at random based on the received reservation information, and stores the key (step ST42). When the information of the reservation person is embedded into this electronic key, it is contemplated such that whose electronic key it is can be made clear. Then, the generated electronic key is encrypted with the public key in the vehicle in the encryption/decryption unit 13 (step ST43), the digital signature of the vehicle is further added thereto by the signature processing unit 14 (step ST44), and the obtained encrypted/digitally signed electronic key is sent from the wireless transceiver unit 12 to the server 30 (step ST45), and the processing is ended.

Note that after receiving the electronic key, the server 30 sends an effect of success of the reservation confirmation to the portable terminal 1 held by the reservation person, along with the electronic key. Also, the electronic key sent to the reservation person at this time is the same as the one shown in FIG. 6.

(Transfer of Electronic Key)

Figure 9:
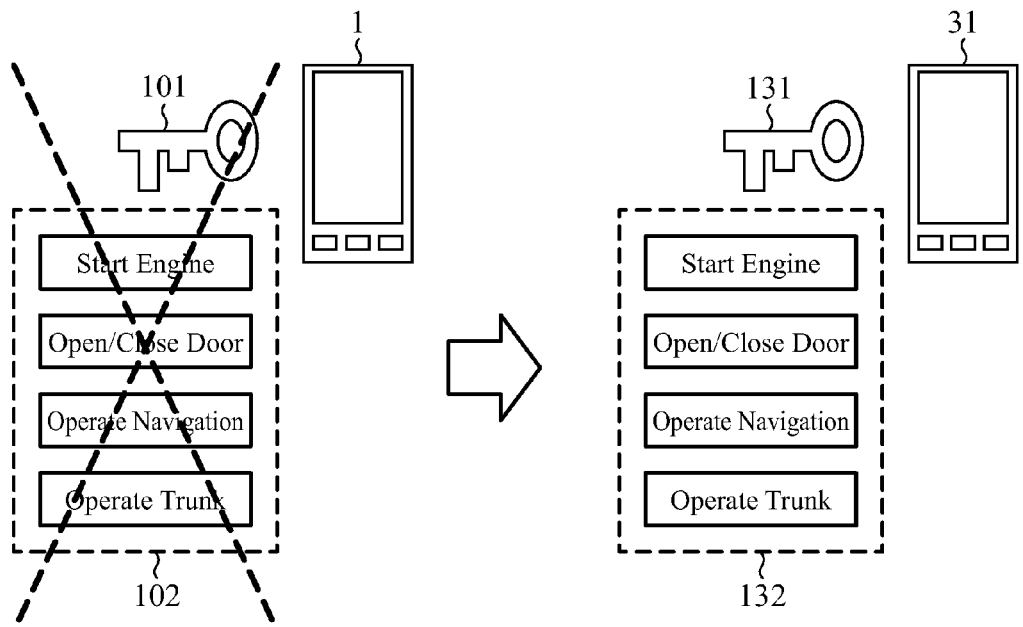
FIG. 9 is a diagram for illustrating a concept of transferring the electronic key held by a transfer source portable terminal to the other portable terminal.
Figure 10:
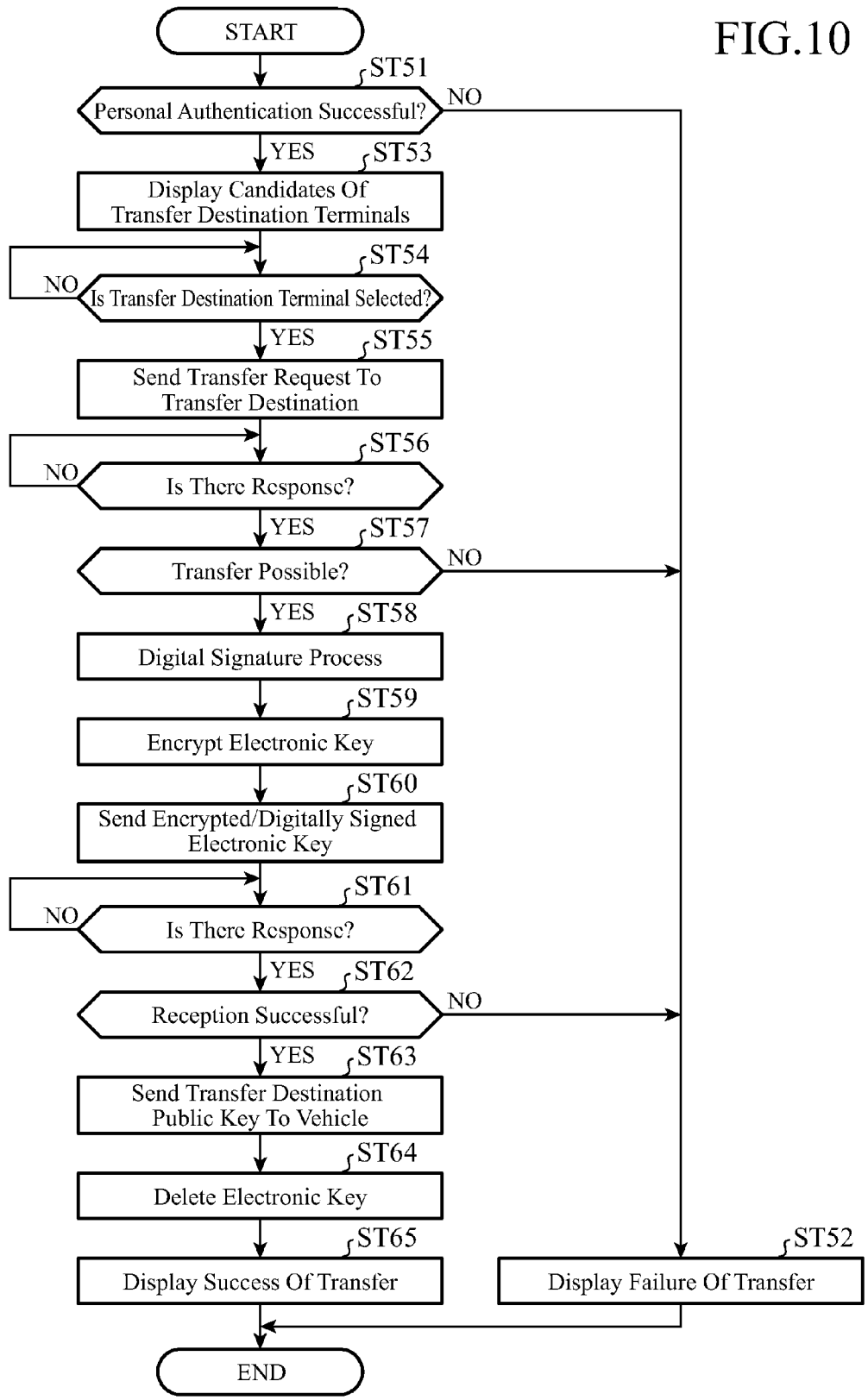
FIG. 10 is a flowchart showing processing in the transfer source portable terminal when the electronic key is transferred.

Next, a description will be given of processing in the following case: for example, in a case where the reservation person (user) who holds the portable terminal 1 having the electronic key issued in a manner described above returns the vehicle having been used in car sharing, and in a case where the person asks someone to return the vehicle, FIG. 9 is a diagram for illustrating a concept of transferring the electronic key held by the transfer source portable terminal 1 to another portable terminal 31. In addition, FIG. 10 is a flowchart showing processing in the transfer source portable terminal 1 when the electronic key is transferred. The block diagram showing the configuration of the transfer destination portable terminal 31 is the same as the block diagram of the transfer source portable terminal 1 shown in FIG. 1.

First of all, personal authentication is performed (such as vein authentication, face authentication, and password authentication) in the transfer source portable terminal 1 (step ST51). This is performed to prevent a third person fraudulently obtaining the portable terminal 1 from transferring the electronic key. If the personal authentication is failed (if NO at step ST51), an effect of failure of transfer is displayed on the display unit 8 (step ST52), and the processing is ended. On the other hand, if the personal authentication is successful (if YES at step ST51), transfer destination portable terminals expected as candidates are listed up on the display unit 8 (step ST53). At this stage, it may be configured such that the transfer destination portable terminals expected as candidates are preliminarily registered and stored. Then, at step ST53, it may be configured that the pre-registered and stored list of the transfer destination portable terminals expected as candidates is automatically displayed, or it may be configured to be displayed by an operation such as pressing a button for displaying the list of the transfer destination portable terminals expected as candidates.

After that, when the operation unit 9 is operated, if the portable terminal to transfer the electronic key from the displayed list of the portable terminals is selected (if YES at ST54), the information processing unit 201 instructs the wireless transceiver unit 2 of the transfer source portable terminal 1 to send a transfer request (including the transfer source public key and so on in the transfer request) to the selected portable terminal 31. Then, the transfer request (including the transfer source public key and so on in the transfer request) is sent from the wireless transceiver unit 2 of the transfer source portable terminal 1 to the selected portable terminal 31 (step ST55), and a response is waited for (step ST56). If there is the response from the transfer destination portable terminal 31 (if YES at step ST56), the response is confirmed, and if the transfer is impossible (if NO at step ST57), an effect of failure of transfer is displayed on the display unit 8 (step ST52), and the processing is ended.

Figures 12, 13:
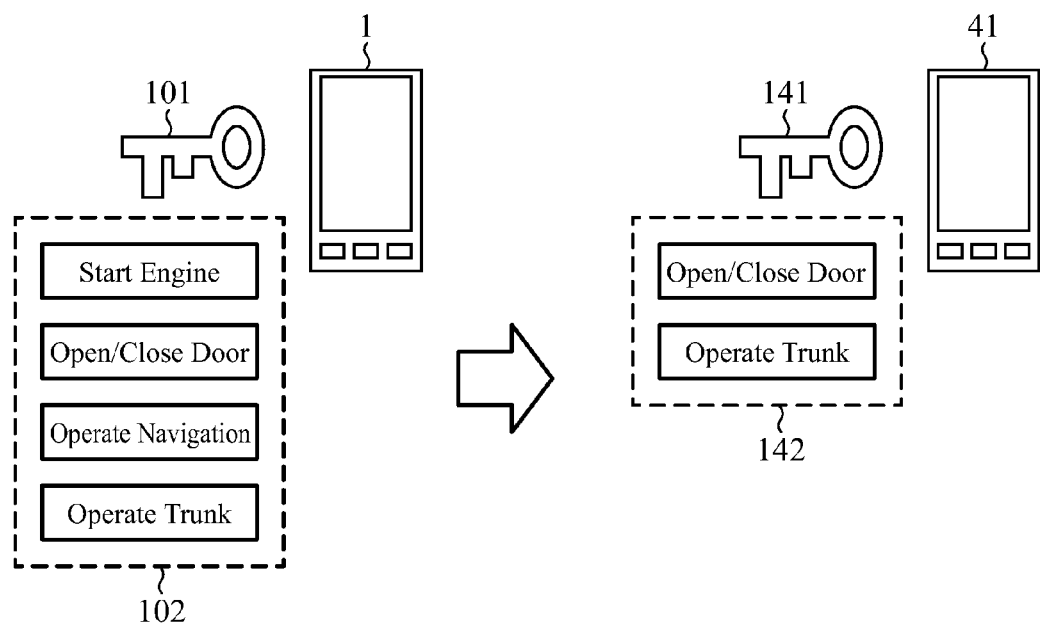
FIG. 12 is a diagram showing a format of the electronic key stored in an electronic key storage unit of the transfer destination portable terminal.
FIG. 13 is a diagram for explaining a concept of copying an electronic key held by a copy source portable terminal to the other portable terminal with a limited function.

On the other hand, if the transfer is possible (if YES at step ST57), the information processing unit 201 stores the public key of the transfer destination portable terminal 31 contained in the response in the encryption key storage unit 6 of the transfer source portable terminal 1, adds transfer destination information (for example, terminal name, MAC address, public key information, and so on) to the electronic key 101, adds its own digital signature in the signature processing unit 4 (step ST58), encrypts the generated electronic key with the transfer destination public key (step ST59), and instructs the wireless transceiver unit 2 of the transfer source portable terminal 1 to send (transfer) the encrypted/digitally signed electronic key 131 to which the transfer source signature information, transfer destination signature information, and vehicle's signature information are added and encrypted, as shown in FIG. 12 described later. Then, the encrypted/digitally signed electronic key 131 is sent (transferred) from the wireless transceiver unit 2 of the transfer source portable terminal 1 to the transfer destination portable terminal 31 (step ST60), and a response is waited for (step ST61). If there is the response from the transfer destination portable terminal 31 (if YES at step ST61), it is determined whether the reception is successful, and if the reception is failed (if NO at step ST62), an effect of failure of transfer is displayed on the display unit 8 (step ST52), and the processing is ended.

On the other hand, if the reception is successful (if YES at step ST62), the public key of the transfer destination portable terminal 31 is sent to the vehicle (vehicle-side terminal 11) (step ST63). In such a way, the vehicle (vehicle-side terminal 11) can authenticate the digital signature of the transfer destination portable terminal 31. Then, the electronic key 101 stored in the electronic key storage unit 7 of the transfer source portable terminal 1 is deleted or disabled (step ST64), an effect of success of transfer is displayed on the display unit 8 (step ST65), and the processing is ended.

Moreover, a method to given notice of the public key of the transfer destination portable terminal 31 to the vehicle (vehicle-side terminal 11) may be provided such that the vehicle-side terminal 11 refers to the transfer destination information contained in the transferred electronic key, not the method by communication as that of step ST62.

Figure 11:
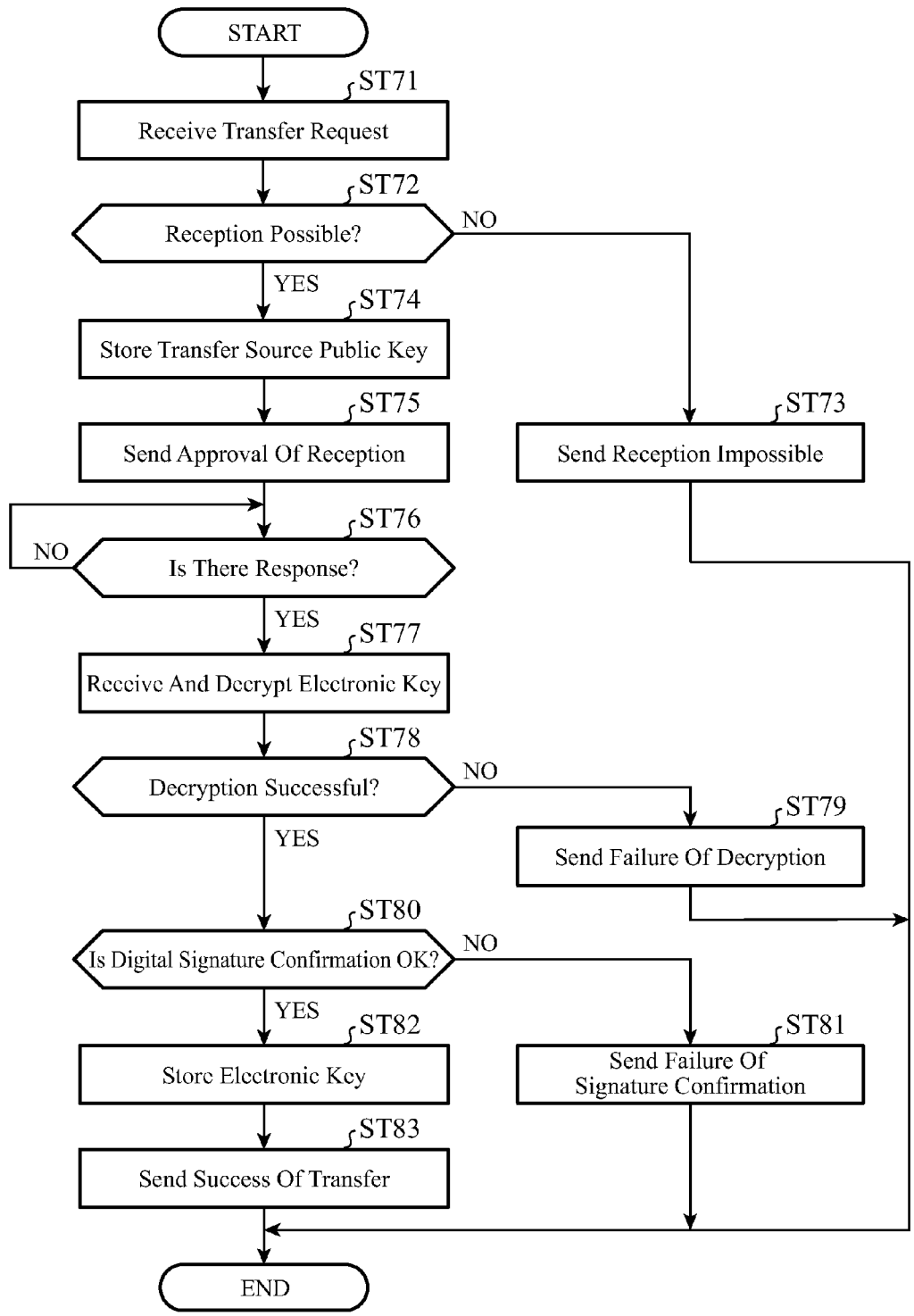
FIG. 11 is a flowchart showing processing in a reception side (transfer destination) portable terminal when the electronic key is transferred.

FIG. 11 is a flowchart showing processing in the reception side (transfer destination) portable terminal 31 when the electronic key is transferred.

First of all, when the wireless transceiver unit 2 of the reception side portable terminal 31 receives the transfer request (step ST71), it is determined whether or not the reception is possible (transfer possible) (step ST72). It is assumed that the holder of the reception side portable terminal 31 can decide whether the reception is possible or not such that, for example, the user carries out an operation for the possibility while a display of reception confirmation is imaged on the display unit 8 of the reception side portable terminal 31. If the reception is impossible (transfer impossible) (if NO at step ST72), the wireless transceiver unit 2 of the reception side portable terminal 31 sends reception impossible (transfer impossible) to the transfer source portable terminal 1 (step ST73), and the processing is ended. On the other hand, if the reception is possible (transfer possible) (if YES at step ST72), the transfer source public key contained in the transfer request received at step ST71 is stored in the encryption key storage unit 6 of the reception side portable terminal 31 (step ST74). Then, acceptance of reception (transfer possible) with the public key of itself (reception side portable terminal 31) is sent from the wireless transceiver unit 2 of the reception side terminal 31 to the transfer source portable terminal 1 (step ST75), and a response is waited for (step ST76).

When there is the response from the transfer source portable terminal 1 (if YES at step ST76), the reception side portable terminal 31 receives the encrypted digitally signed electronic key 131, and decrypts it with the private key of itself (reception side portable terminal 31) (step ST77). If the decryption is failed (if NO at step ST78), the wireless transceiver unit 2 of the reception side portable terminal 31 sends an effect of failure of decryption to the transfer source portable terminal 1 (step ST79), and the processing is ended. On the other hand, if the decryption is successful (if YES at step ST78), the digital signature is confirmed (step ST80). Here, the confirmation of the digital signature is performed with the use of the transfer source public key contained in the transfer request.

If the digital signature cannot be confirmed (if NO at step ST80), the wireless transceiver unit 2 of the reception side portable terminal 31 sends an effect of failure of digital signature to the transfer source portable terminal 1 (step ST81), and the processing is ended. On the other hand, if the digital signature can be confirmed (if YES at step ST80), the digitally signed electronic key having been obtained and decrypted is stored in the electronic key storage unit 7 of the reception side portable terminal 31 (step ST82), and an effect of success of transfer is sent from the wireless transceiver unit 2 of the reception side portable terminal 31 to the transfer source portable terminal 1 (step ST83), and the processing is ended.

Through these process steps, the whole electronic key 101 (including a function 102) having been held by the transfer source portable terminal 1 is transferred from the electronic key 131 of the transfer source portable terminal 31 (including a function 132) as shown in FIG. 9, and then the electronic key 101 is deleted or disabled.

With this configuration, the transfer of the electronic key between the information terminals can be performed safely. Note that since the electronic key itself is encrypted by the vehicle (vehicle-side terminal 11), in this case, the whole electronic key may be sent without an encryption with the transfer source public key. This transfer may also be made via the server 30.

FIG. 12 shows a format of the electronic key 131 stored in the electronic key storage unit 7 of the transfer source portable terminal 31. The key includes the transfer source signature because, as mentioned above, the reservation person dedicated electronic key requires the reservation person's signature (the transfer source's signature if it is a first transfer). Additionally, it is configured that when the transferred electronic key is further transferred, the "transfer source signature" and "transfer destination information" will be added thereto sequentially.

(Copy of Electronic Key)

Next, a description will be given of processing in the following case: for example, in a case where the reservation person (user) who holds the portable terminal 1 having the electronic key issued as mentioned above asks someone to carry out only the luggage in the trunk of the vehicle having been used in car sharing, when the operation unit 9 of the portable terminal 1 of the reservation person (user) is operated, a request in which only a limited function of the functions of the electronic key stored in the electronic key storage unit 7 is copied to the other portable terminal is accepted.

Figure 14:
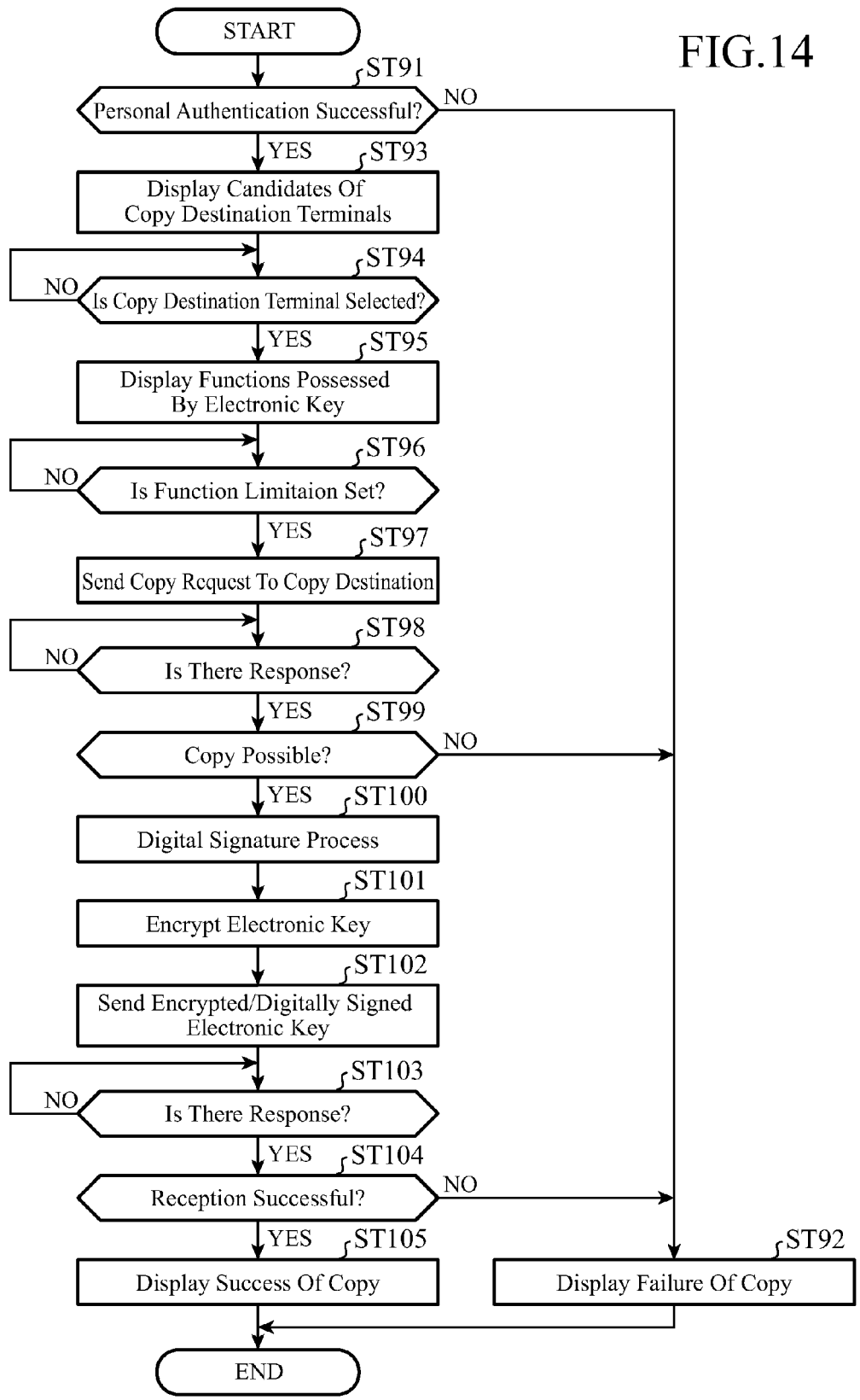
FIG. 14 is a flowchart showing processing in the copy source portable terminal when the electronic key is copied.

FIG. 13 is a diagram for illustrating a concept of copying the electronic key held by the copy source portable terminal 1 to another portable terminal 41 with a limited function. In addition, FIG. 14 is a flowchart showing processing in the copy source portable terminal 1 when the electronic key is copied. Note that a block diagram showing a configuration of the copy destination portable terminal 41 is the same as the block diagram of the copy source portable terminal 1 shown in FIG. 1.

First of all, personal authentication is performed (for example, vein authentication, face authentication, password authentication, and so on) in the copy source portable terminal 1 (step ST91). This is performed to prevent a third person obtaining fraudulently the portable terminal 1 from copying the electronic key. If the personal authentication is failed (if NO at step ST91), an effect of failure of copy is displayed on the display unit 8 (step ST92), and the processing is ended. On the other hand, if the personal authentication is successful (if YES at step ST91), copy destination portable terminals expected as candidates are listed up on the display unit 8 (step ST93). At this stage, it may be configured such that the copy destination portable terminals expected as candidates are preliminarily registered and stored. Then, at step ST93, it may be configured that the pre-registered and stored list of the copy destination portable terminals expected as candidates is automatically displayed, or it may be configured to be displayed by an operation such as pressing a button for displaying the list of the copy destination portable terminals expected as candidates.

When the portable terminal to copy the electronic key is selected from the displayed list (if YES at step ST94), the functions possessed by the electronic key 101 are listed up on the display unit 8 (step ST95). This list of the functions is contained in the electronic key 101 as electronic key information. Then, when the portable terminal to copy the electronic key is selected, at step ST95, it may be configured that the list of the functions possessed by the electronic key 101 is automatically displayed, or it may be configured to be displayed by an operation such as pressing a button for displaying the list of the copy destination portable terminals expected as candidates.

Thereafter, the functions in which the operations are allowed are selected from the list of the functions 102 of the electronic key 101 displayed on the display unit 8, and when a setting of limiting the functions is done (if YES at step ST96), the information processing unit 201 of the copy source portable terminal 1 instructs the wireless transceiver unit 2 of the copy source portable terminal 1 to send from the wireless transceiver unit 2 of the copy source portable terminal 1 the electronic key with function limitation information to enable only a selected function to the portable terminal 41 selected as the copy destination along with a copy request and the public key of itself (copy source portable terminal 1). Then, the copy request and its own public key are sent from the wireless transceiver unit 2 of the portable terminal 1 to the selected portable terminal 41 (step ST97), and a response is waited for (step ST98). If there is the response sent from the copy destination portable terminal 41 (if YES at step ST98), the response is confirmed, and if the copy is impossible (if NO at step ST99), an effect of failure of copy is displayed on the display unit 8 (step ST92), and the processing is ended.

On the other hand, if the copy is possible (if YES at step ST99), the public key of the copy destination portable terminal 41 attached to the response of copy possible is stored in the encryption key storage unit 6 of the copy source portable terminal 1; information on the copy destination (for example, terminal name, MAC address, transfer destination public key information, and so on) is added to the electronic key 101; and the digital signature of itself (copy source portable terminal 1) is added in the signature processing unit 4 (step ST100). Further, the key is encrypted with the copy destination public key (step ST101), and the wireless transceiver unit 2 of the copy source portable terminal 1 is instructed to send (copy) the encrypted/digitally signed electronic key 141 to which the copy source signature information, copy destination signature information, function limitation information, and vehicle' signature information are added and encrypted, as shown in FIG. 16 described later. The encrypted/digitally signed electronic key 141 is sent (copied) from the wireless transceiver unit 2 of the copy source portable terminal 1 to the copy destination portable terminal 41 (step ST102), and a response is waited for (step ST103).

If there is the response sent from the copy destination portable terminal 41 (if YES at step ST103), the response is confirmed, and if the reception is failed (copy failure) (if NO at step ST104), an effect of failure of copy is displayed on the display unit 8 (step ST92), and the processing is ended. On the other hand, if the reception is successful (copy success) (if YES at step ST104), an effect of success of copy is displayed on the display unit 8 (step ST105), and the processing is ended.

Figure 15:
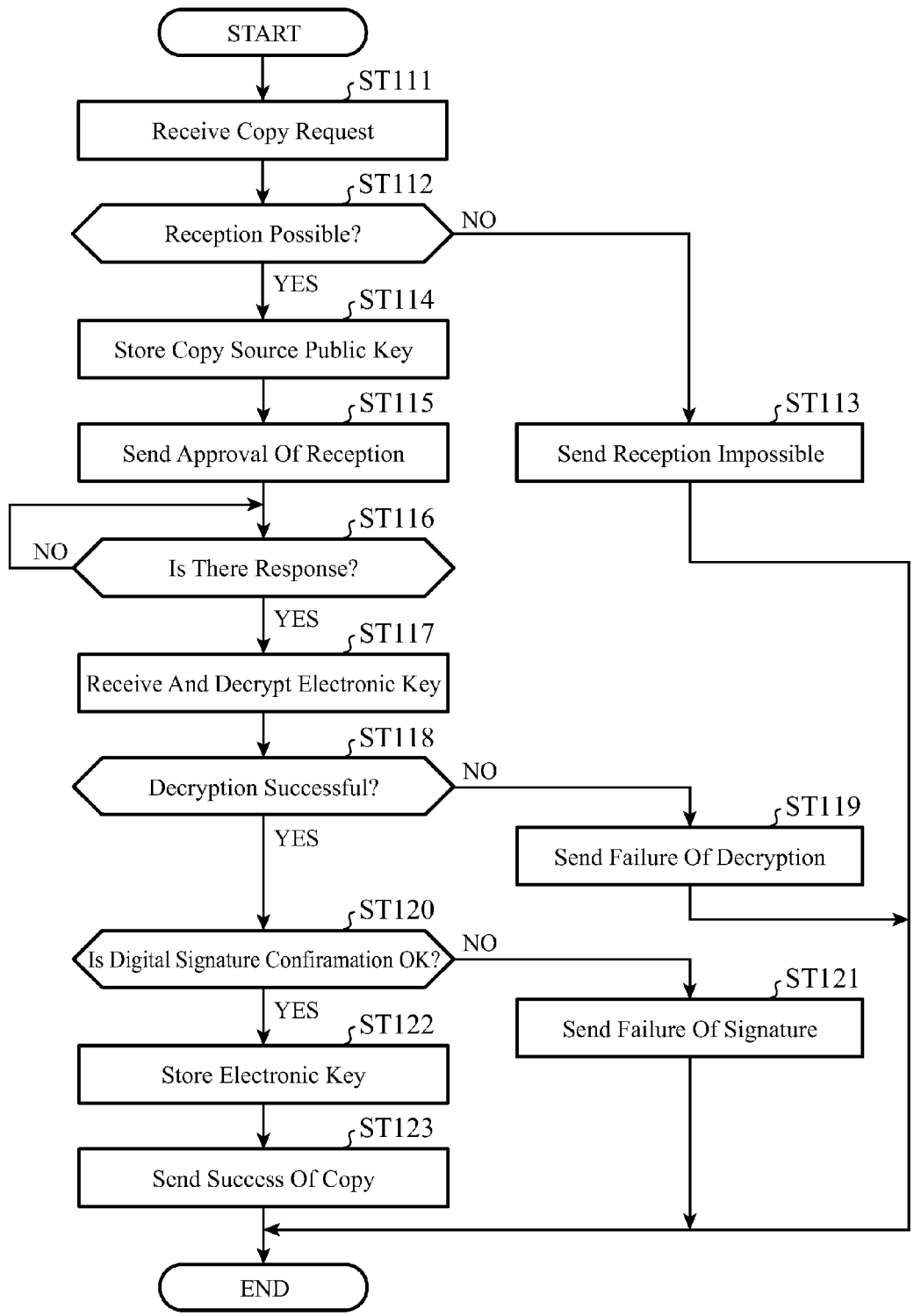
FIG. 15 is a flowchart showing processing in a reception side (copy destination) portable terminal when the electronic key is copied.

FIG. 15 is a flowchart showing processing in the reception side (copy destination) portable terminal 41 when the electronic key is copied.

First of all, when the wireless transceiver unit 2 of the copy destination portable terminal 41 receives a copy request (step ST111), it is determined whether or not the reception is possible (copy possible) (step ST112). It is assumed that the holder of the copy destination portable terminal 41 can decide whether the reception is possible or not such that, for example, the user carries out an operation for the possibility while a display of reception confirmation is imaged on the display unit 8 of the copy destination portable terminal 41. If the reception is impossible (copy impossible) (if NO at step ST112), the wireless transceiver unit 2 of the copy destination portable terminal 41 sends reception impossible (copy impossible) (step ST113) to the copy source portable terminal 1, and the processing is ended. On the other hand, if the reception is possible (copy possible) (if YES at step ST112), the copy source public key contained in the copy request received at step ST111 is stored in the encryption key storage unit 6 of the copy destination portable terminal 41 (step ST114). Then, a reception approval (copy possible) response is sent from the wireless transceiver unit 2 of the copy destination portable terminal 41 to the copy source portable terminal 1 along with the public key of itself (copy destination portable terminal 41) (step ST115), and a response is waited for (step ST116).

When there is the response from the copy source portable terminal 1 (if YES at step ST116), the copy destination portable terminal 41 receives the encrypted, digitally signed electronic key 141, and decrypts it with the private key of itself (copy destination portable terminal 41) (step ST117). If the decryption is failed (if NO at step ST118), the wireless transceiver unit 2 of the copy destination portable terminal 41 sends an effect of failure of decryption to the copy source portable terminal 1 (step ST119), and the processing is ended. At this time, the effect of failure of decryption may be displayed on the display unit 8. On the other hand, if the decryption is successful (if YES at step ST118), the digital signature is confirmed with the use of the copy source public key contained in the copy request (step ST120).

If the digital signature cannot be confirmed (if NO at step ST120), the wireless transceiver unit 2 of the copy destination portable terminal 41 sends an effect of failure of digital signature to the copy source portable terminal 1 (step ST121), and the processing is ended. On the other hand, if the digital signature can be confirmed (if YES at step ST120), the digitally signed electronic key that has been obtained and decrypted is stored in the electronic key storage unit 7 of the copy destination portable terminal 41 (step ST122), and an effect of success of copy is sent from the wireless transceiver unit 2 of the copy destination portable terminal 41 to the copy source portable terminal 1 (step ST123), and the processing is ended.

Through these process steps, the electronic key 131 containing only the functions 132 of, for example, "open/close door" and "operate trunk" of the electronic key 101 (including the functions 102) in the copy source portable terminal 1, as shown in FIG. 13, is copied to the copy destination portable terminal 41.

With this configuration, the copy of the electronic key with a limited function can be performed safely between the portable terminals, and also completed without unnecessary operations. In addition, the addition of the copy destination information enables confirmation of whose key is copied for whom, and the addition of the digital signature prevents fraudulent reception of the key and alteration of the limitation on the functions.

FIG. 16 shows a format of the electronic key 141 stored in the electronic key storage unit 7 of the copy destination portable terminal 41. Also, when the aforementioned transferred electronic key 131 is further copied, the electronic key with a format as shown in FIG. 17 is provided. Additionally, in order to copy further the copied electronic key, it maybe configured that the "function limitation information", "copy destination information", and "copy source signature" are sequentially added thereto, and that the resultant is sent to a new copy destination.

This configuration enables a consecutive copying, and the added signatures show the route of copying, which is convenient.

(Operation by Electronic Key)

Next, the operation with the electronic key, that is, the steps ST6 to ST8 shown in FIG. 3 in the processing sequence at the time of reservation, and the steps ST35 to ST37 shown in FIG. 7 in the processing sequence at the time of acquisition of the electronic key, will be described in detail.

Figure 18:
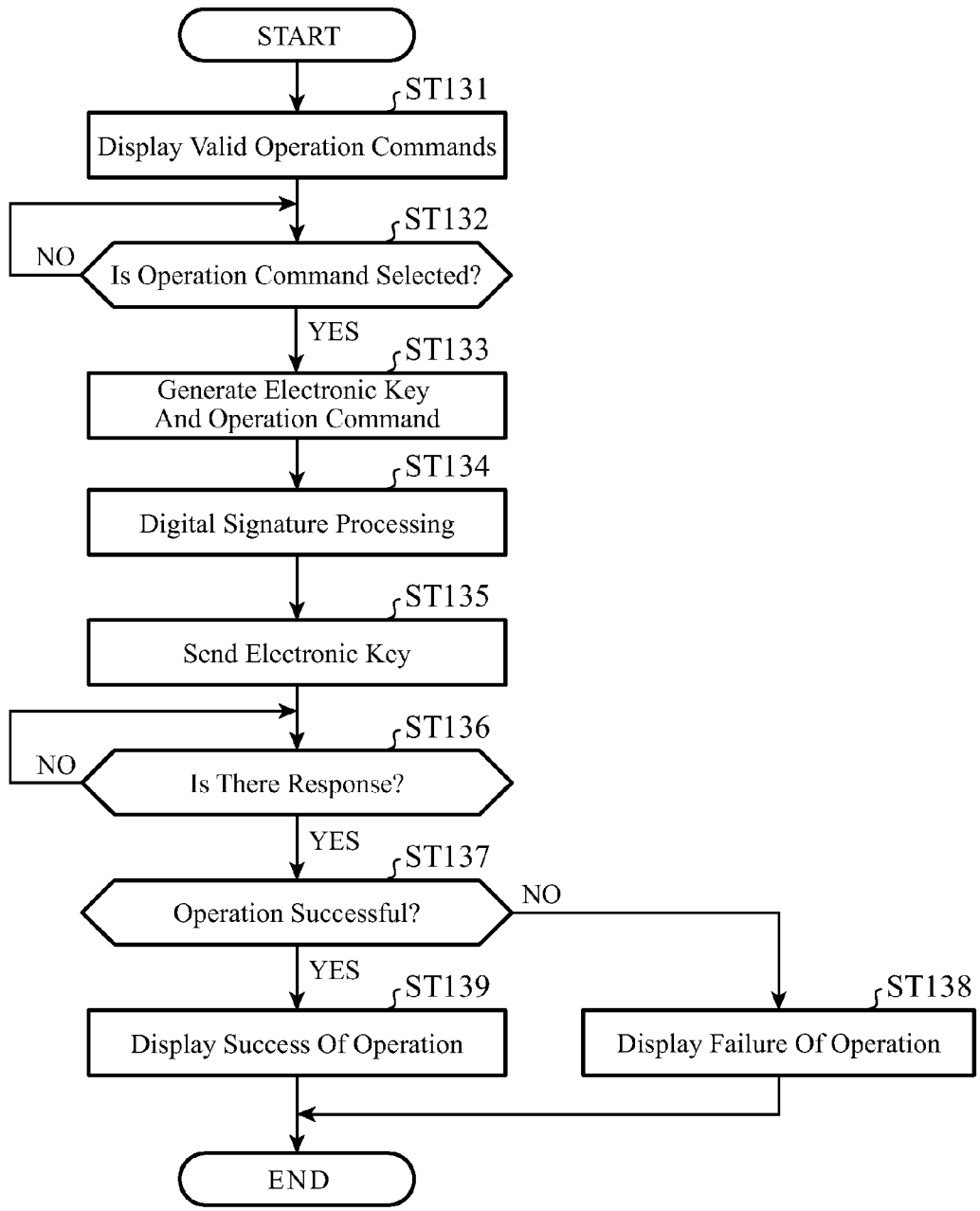
FIG. 18 is a flowchart showing processing on the side of the portable terminal when the vehicle is operated with the electronic key.

FIG. 18 is a flowchart showing processing in the portable terminal side when the vehicle is operated with the use of the electronic key.

First, operable functions (valid operation commands) are displayed on the display unit 8 of the portable terminal that holds the electronic key (step ST131), and a selection of the function to be desirably operated by the user from the functions is waited for (step ST132). The operable functions (valid operation commands) are the functions 102, 132, 142, and so on shown in FIG. 9 and FIG. 13. If the electronic key is a copied one, valid function information can be obtained from the "function limitation information" of the electronic key shown in FIG. 16 and displayed.

Figure 19:
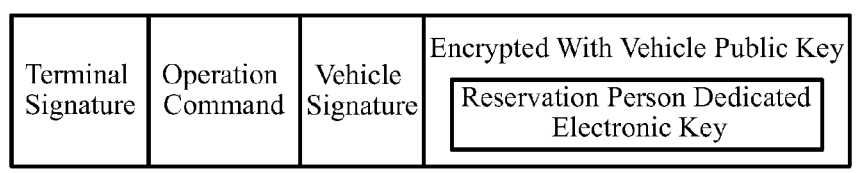
FIG. 19 is a diagram showing a format of the electronic key generated when an operation command is selected.

When the operation command is selected (if YES at step ST132), operation data is generated by adding the operation command to the electronic key (step ST133), and the digital signature of the portable terminal is added to the generated operation data in the signature processing unit 4, to thereby complete encrypted/digitally signed operation data having the format shown in FIG. 19 (step ST134). Then, the wireless transceiver unit 2 sends the completed operation data (step ST135) to the vehicle (vehicle-side terminal 11), and a response is waited for (step ST136). If the response is received (if YES at step ST136), it is confirmed whether or not the operation is successful (step ST137), and if the operation is failed (if NO at step ST137), an effect of failure of operation is displayed on the display unit 8 (step ST138), and the processing is ended. On the other hand, if the operation is successful (if YES at step ST137), an effect of success of operation is displayed on the display unit 8 (step ST139), and the processing is ended.

Figure 20:
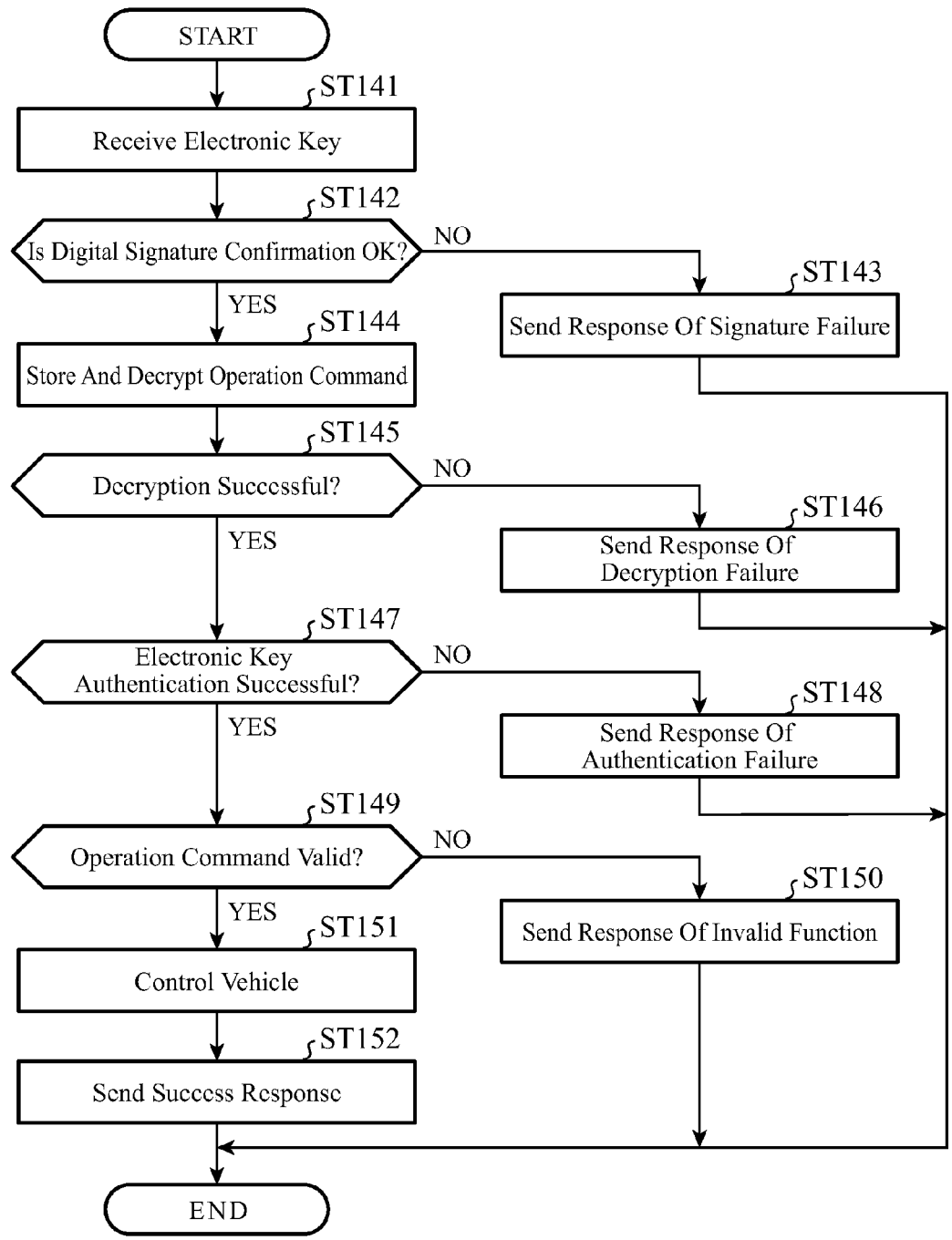
FIG. 20 is a flowchart showing processing in the vehicle-side terminal when the vehicle is operated with the electronic key in a case where the electronic key is sent from the portable terminal.

In steps ST135 and ST136 of the flowchart shown in FIG. 18 as stated above, FIG. 20 is a flowchart showing processing in the vehicle side (vehicle-side terminal 11) when the vehicle is operated by the electronic key in a case where the key is transmitted from the portable terminal.

First, the wireless transceiver unit 12 of the vehicle-side terminal 11 receives the electronic key (step ST141), and the signature processing unit 14 checks if the digital signature of the electronic key is that of the reservation person (step ST142). Then, if the digital signature cannot be confirmed (if NO at step ST142), the wireless transceiver unit 2 sends a response indicating failure of signature confirmation to the portable terminal (step ST143), and the processing is ended. On the other hand, if the digital signature can be confirmed (if YES at step ST142), the operation command is stored, and decrypted with the use of the private key of the vehicle in the encryption/decryption unit 13 (step ST144).

If the decryption is failed (if NO at step ST145), the wireless transceiver unit 12 sends a response indicating failure of decryption to the portable terminal (step ST146), and the processing is ended. On the other hand, If the decryption is successful (if YES at step ST145), the electronic key is authenticated in the electronic key authentication unit 17 (step ST147). Note that in the authentication of the electronic key, not only the matching of the electronic key but also information associated with the authentication, for example, whether or not the signature of the reservation person is added to the command, is checked.

If the authentication of the electronic key is failed (if NO at step ST147), the wireless transceiver unit 12 sends a response indicating failure of electronic key authentication to the portable terminal (step ST148), and the processing is ended. On the other hand, if the authentication of the electronic key is successful (if YES at step ST147), the operation command stored at step ST144 is analyzed and it is determined whether it is the valid operation command or not (step ST149). If the key is a copied one, the analysis is also made by referring to the "function limitation information" shown in FIG. 16.

If the validity of the operation command cannot be confirmed (if NO at step ST149), the wireless transceiver unit 12 sends a response indicating that it is an invalid command (invalid function response) to the portable terminal (step ST150), and the processing is ended. On the other hand, if the operation command is valid (if YES at step ST149), the vehicle control unit 21 controls the vehicle in accordance with the operation command (step ST151), a success response is sent from the wireless transceiver unit 12 to the portable terminal (step ST152), and the processing is ended.

With this configuration, the vehicle can be operated by the electronic key, and even in the electronic key with the limited operation function, the vehicle can be operated within a limited range thereof.

(Supplement of Operation by Copied Electronic Key)

Additionally, in a case where the electronic key is a copied one (copied electronic key), there are a multiple pieces of information added to the format of the electronic key, and thus these confirmation become necessary.

Figure 21:
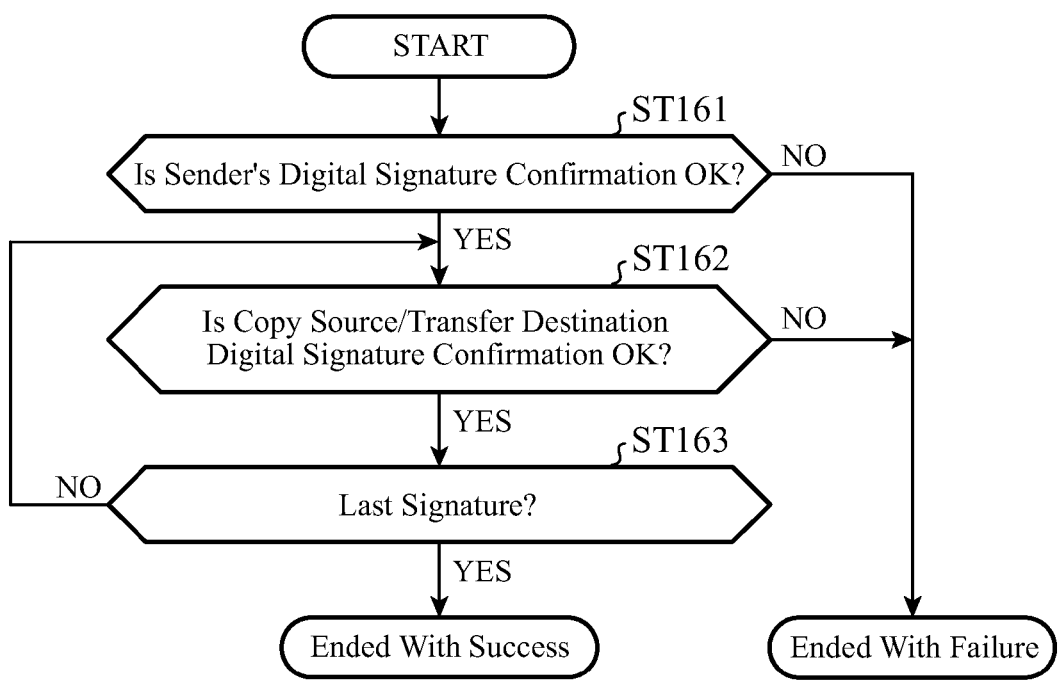
FIG. 21 is a flowchart showing detailed processing when the vehicle-side terminal confirms in a signature processing unit whether or not a digital signature of the electronic key sent from the portable terminal is that of a reservation person.

At step ST142 in the flowchart shown in FIG. 20 as mentioned above, FIG. 21 is a flowchart showing detailed processing when the vehicle-side terminal 11 confirms in the signature processing unit 14 whether or not the digital signature of the electronic key sent from the portable terminal is that of the reservation person.

The vehicle-side terminal 11 that has received the electronic key confirms the sender's digital signature signed at the top of the data of the received electronic key in the signature processing unit 14 (step ST161). If the digital signature cannot be confirmed (if NO at step ST161), this processing is ended due to determination of failure (ended with failure). On the other hand, if the digital signature can be confirmed (if YES at step ST161), and if the electronic key has the format shown in FIG. 16, for example, the next digital signature is confirmed based on the information contained in the copy destination information (step ST162).

At this stage, if the digital signature cannot be confirmed (if NO at step ST162), the processing is ended due to determination of failure (ended with failure). On the other hand, if the digital signature is confirmed (if YES at step ST162), it is checked whether or not it is the last signature (step ST163). Then, if it is the last signature (if YES at step ST163), it is determined that the digital signature verification is successful and this processing is ended (ended with success), and if not (if NO at step ST163), the processing returns again to the step of confirming the digital signature (ST162) and this processing is repeated.

Note that whether the signature is the last one or not can readily be determined (step ST163) by including information that indicates how many times the key has been copied (or transferred) in the copy destination information (or transfer destination information).

Moreover, for the functions of the electronic key, it may be contemplated to include not only the vehicle functions such as the functions 102, 132, and 142 shown in FIG. 9 and FIG. 13, but also a function that sets an expiration time (valid time), and/or a function that sets a valid range of positional information based on the GPS information. Specifically, in a case where the electronic key may include function information with the valid time in which the vehicle is operable, or include function information set by the valid range of the positional information in which the vehicle is operable, with respect to the transferred or copied electronic key, if the set expiration time elapses, or if the portable terminal with a transferred or copied key is not located within the valid range of the positional information, it may be configured that the operations to the vehicle by the transferred or copied electronic key are disabled.

In this way, the electronic key can be transferred or copied by setting a usable period, and limiting a usable range.

In addition, since the copied electronic key corresponds to a temporal use, it is configured such that the copied electronic key can be deleted when the user having the copy source (master key) accesses the copy destination portable terminal. Note that since the information of the copy destination portable terminal is exchanged upon copying the key, it may be configured such that acquisition of access authority and/or access destination are obtained at that time.

Furthermore, for example, in an event where the copied electronic key is abused, it may be configured such that the functions of the electronic key copied to the copy destination portable terminal can be stopped. For example, in a case where the operation unit 9 of the copy source portable terminal is operated and the information processing unit 201 of the copy source portable terminal receives a request to stop the functions of the copied electronic key, an instruction that sends the stop of the functions of the electronic key to the wireless transceiver unit of the copy destination portable terminal is carried out. Then, since the information of the copy destination portable terminal can be obtained at the time of copying, it may be configured to be accessed to the copy destination portable terminal based on that information to thus delete the copied electronic key or stop the functions thereof.

Furthermore, in a situation where the electronic key once function stopped in the copy destination portable terminal is retained without deletion, with respect to the copy destination portable terminal thus function stopped, it may be configured such that the functions of the electronic key at the copy destination portable terminal are made valid again by the user having the master key, namely by the copy source portable terminal. For example, in a case where the operation unit 9 of the copy source portable terminal is operated and the information processing unit 201 at the copy source portable terminal receives a request to enable again the functions of the electronic key that are function stopped previously, the copy source portable terminal instructs to send validity of the stopped functions of the electronic key to the copy destination portable terminal. Then, it may be configured such that the copy destination portable terminal is accessed to enable again the stopped functions of the copied electronic key.

As mentioned above, according to Embodiment 1, since only the function of the electronic key can be passed (transferred or copied) to another person without the need of passing a physical key, a card, a portable terminal, and/or the like thereto, for example, an operation of the locked object can be asked someone in a remote location instead, resulting in a great convenience.

Moreover, there is described the case that the electronic key system of this invention is applied to the car sharing system in this embodiment by way example; however, in addition to a car sharing system or rent-a-car system established between the portable terminal held by the user and the lock-side terminal mounted in the vehicle (locked object), the electronic key system according to this invention and the lock-side terminal and portable terminal used in the system can be applied to a variety of systems in which the user conventionally locks or unlocks with a key, a card, and the like, for example, a locking system established between the portable terminal held by the user and a locked-side terminal installed in a home door (locked object) or a hotel room (locked object).

Within the scope of the present invention, any given constituent element of its embodiment maybe modified, or any given constituent element in the embodiment may be omitted.

INDUSTRIAL APPLICABILITY

In addition to the car sharing system or rent-a-car system established between the portable terminal held by the user and the lock-side terminal mounted in the vehicle (locked object), the electronic key system according to this invention and the lock-side terminal and portable terminal used in the system can be applied to a variety of systems in which the user conventionally locks or unlocks with the key, card, and the like, for example, the locking system established between the portable terminal held by the user and the locked-side terminal installed in the home door (locked object) or the hotel room (locked object).

1, 31, 41: portable terminal
2, 12: wireless transceiver unit
3, 13: encryption/decryption unit
4, 14: signature processing unit
5, 15: personal authentication unit
6, 18: encryption key storage unit
7: electronic key storage unit
8, 19: display unit
9, 20: operation unit
10, 22: reservation information storage unit
11: lock-side terminal (vehicle-side terminal)
16: electronic key generation storage unit
17: electronic key authentication unit
21: vehicle control unit
30: server
101, 131, 141: electronic key
102, 132, 142: electronic key function
201, 211: information processing unit.

The invention claimed is:

1. An electronic key system, comprising:
a lock-side terminal mounted in a locked object, including
a first information processing unit having an electronic key generation storage that creates and stores a randomly-generated electronic key including function information defining an operable function to the locked object, and
a first wireless transceiver unit for sending and receiving information including the electronic key to and from at least one portable terminal,
wherein the electronic key locks and unlocks the locked object when the electronic key is received from a portable terminal; and
a first portable terminal including
a second wireless transceiver unit for sending and receiving information to and from the lock-side terminal and any other portable terminals, and
a second information processing unit including an electronic key storage that stores the electronic key received from the lock-side terminal via the second wireless transceiver unit;

wherein reservation information contained in a reservation information storage unit of the first portable terminal is sent via the second wireless transceiver unit to the lock-side terminal, wherein when the reservation information sent by the first portable terminal matches reservation information stored in a reservation information storage unit of the lock-side terminal, the first information processing unit instructs the first wireless transceiver unit to send the electronic key stored in the electronic key generation storage to the first portable terminal; and a second portable terminal including
a third wireless transceiver unit for sending and receiving information to and from the lock-side terminal and any other portable terminals, and
a third information processing unit having an electronic key storage, wherein when receiving a request to transfer or copy the electronic key stored in the electronic key storage of the first portable terminal, the second information processing unit instructs the second wireless transceiver unit to send the request to transfer or copy the electronic key with function limitation information in which only a selected function is enabled to the second portable terminal, and wherein when receiving the request to transfer or copy the electronic key from the first portable terminal via the third wireless transceiver unit, the third information processing unit determines whether or not the transfer or copy is possible, and sends to the first portable terminal a response of transfer or copy possible, or transfer or copy impossible based on a result of the determination, and in a case where there is a response of transfer or copy possible with respect to the request to transfer or copy the electronic key from the first portable terminal via the second wireless transceiver unit, the second information processing unit instructs the second wireless transceiver unit to transfer or copy the electronic key to the second portable terminal, and when the electronic key is transferred or copied from the first portable terminal via the second wireless transceiver unit, the transferred or copied electronic key is stored in the electronic key storage of the third information processing unit.

2. The electronic key system according to claim 1, wherein the first information processing unit creates and stores the electronic key after the lock-side terminal receives the reservation information from the first portable terminal.

3. The electronic key system according to claim 2, wherein when receiving a request to stop a function controlled by the copied electronic key, the second information processing unit instructs the second wireless transceiver unit to send an instruction to stop the function to the second portable terminal.

4. The electronic key system according to claim 3, wherein after the function is stopped, when receiving a request to enable again the function controlled by the copied electronic key, the second information processing unit instructs the second wireless transceiver to send an instruction to the second portable terminal to enable the stopped function.

5. The electronic key system according to claim 2, wherein
the electronic key includes first signature information related to a holder of the electronic key, a second signature information related to the second portable terminal to which the electronic key is to be transferred or copied, and a third signature information related to the locked object, and the second information processing unit authenticates the electronic key holder on the basis of the first signature information related to the electronic key holder when the electronic key is transferred or copied to the second portable terminal.

6. The electronic key system according to claim 5, wherein every time the electronic key is transferred or copied to the second portable terminal, the first second signature information of a holder of the second portable terminal is added thereto.

7. The electronic key system according to claim 2, wherein the transferred or copied electronic key includes function information that sets a valid time period during which the locked object is operable with the transferred or copied electronic key, and
the transferred or copied electronic key is disabled from operating the locked object when the set valid time period passes.

8. The electronic key system according to claim 2, wherein
the transferred or copied electronic key includes function information that sets a valid range of positional information where the locked object is operable with the transferred or copied electronic key, and
the transferred or copied electronic key is disabled from operating the locked object in a case where positional information of the second portable terminal is not located within the valid range of positional information.

9. An electronic key system, comprising:
a lock-side terminal mounted in a locked object, including a first information processing unit having an electronic key generation storage that stores a randomly generated electronic key including function information defining an operable function to the locked object, and configured to at least lock and unlock the locked object by receiving a signal including the electronic key from a portable terminal, and a first wireless transceiver unit configured to send and receive various pieces of information including the electronic key to and from the portable terminal;

the portable terminal including a second wireless transceiver unit configured to send and receive the various pieces of information including the electronic key to and from the lock-side terminal and to communicate with at least one other portable terminal, and a second information processing unit including an electronic key storage that stores the electronic key received from the lock-side terminal via the second wireless transceiver unit;

the other portable terminal including a third wireless transceiver unit configured to send and receive information to and from the lock-side terminal, and a third information processing unit having an electronic key storage, wherein the first information processing unit instructs the first wireless transceiver unit to send the electronic key to the portable terminal when receiving a request from the portable terminal via the first wireless transceiver unit, wherein when receiving a request to transfer or copy the electronic key stored in the electronic key storage of the second information processing unit to the other portable terminal, the second information processing unit instructs the second wireless transceiver unit to send the request to transfer or copy the electronic key with function limitation information in which only a selected function is enabled to the other portable terminal, and when there is a response of transfer or copy possible with respect to the request to transfer or copy the electronic key from the portable terminal via the second wireless transceiver unit, the second information processing unit instructs the second wireless transceiver unit to transfer or copy the electronic key to the other portable terminal, wherein when receiving the request to transfer or copy the electronic key from the portable terminal via the third wireless transceiver unit, the third information processing unit determines whether or not the transfer or copy is possible, and sends to the portable terminal the response of transfer or copy possible, or transfer or copy impossible based on a result of the determination, and when the electronic key is transferred or copied from the portable terminal via the second wireless transceiver unit, the transferred or copied electronic key is stored in the electronic key storage of the third information processing unit.

* * * * *